United States Patent [19]

Goad et al.

[11] Patent Number: 4,921,119

[45] Date of Patent: May 1, 1990

[54] FOOD WARMER AND LIFTING FRAME

[75] Inventors: Eugine W. Goad, Dayton; John V. Drube, Minneapolis, both of Minn.

[73] Assignee: Industrial Design & Engineering Associates, Rogers, Minn.

[21] Appl. No.: 353,782

[22] Filed: May 18, 1989

[51] Int. Cl.⁵ .............................................. B65D 25/22
[52] U.S. Cl. ..................................... 220/212; 99/483; 99/646 C; 220/85 H; 220/94 R; 220/260; 220/334
[58] Field of Search ................. 99/340, 352, 357, 403, 99/483, 646 C, 449; 220/85 H, 94 R, 96, 242-244, 249-251, 260, 262-264, 212, 446, 408, 334

[56] References Cited

U.S. PATENT DOCUMENTS

| 498,569 | 5/1893 | Peterson . | |
| 629,793 | 8/1899 | Klotz | 220/260 |
| 1,258,503 | 3/1918 | Tritle . | |
| 3,179,287 | 4/1965 | Rickmeier, Jr. | 220/94 R |
| 3,299,915 | 1/1967 | Clark | 220/263 |
| 3,924,778 | 12/1975 | Sorensen | 220/94 R |
| 4,361,252 | 11/1982 | Black et al. | 220/242 |
| 4,375,711 | 3/1983 | Franzen et al. | 16/252 |
| 4,494,672 | 1/1985 | Pearson | 220/85 H |

FOREIGN PATENT DOCUMENTS

| 0358572 | 2/1919 | France | 220/335 |
| 0649054 | 4/1985 | Switzerland | 220/94 R |
| 0660450 | 4/1987 | Switzerland | 220/260 |
| 0808023 | 1/1959 | United Kingdom . | |

Primary Examiner—Jimmy G. Foster
Attorney, Agent, or Firm—James V. Harmon

[57] ABSTRACT

A combination food warming vessel and lifting frame is described in which a food warming vessel of conventional construction includes side and bottom walls and an upper open wide mouth with a rim extending therearound can be lifted by a separate ring-shaped lifting frame element which encircles the food warming vessel. The lifting frame includes a central opening adapted to receive the food warming vessel so that the rim of the vessel rests on the upper surface of the lifting frame. The frame includes portions that extend laterally beyond the edge of the rim which are adapted to be grasped manually for lifing the vessel. Hinged to the frame on one side thereof is a cover support arm which has a clasp at its free end for connecting the arm to a cover for the vessel. This allows the cover to be raised by pivoting the arm from the hinged connection with the lifting frame. The lifting frame, arm and cover can all be separated from the vessel when the vessel is to be refilled or cleaned.

18 Claims, 3 Drawing Sheets

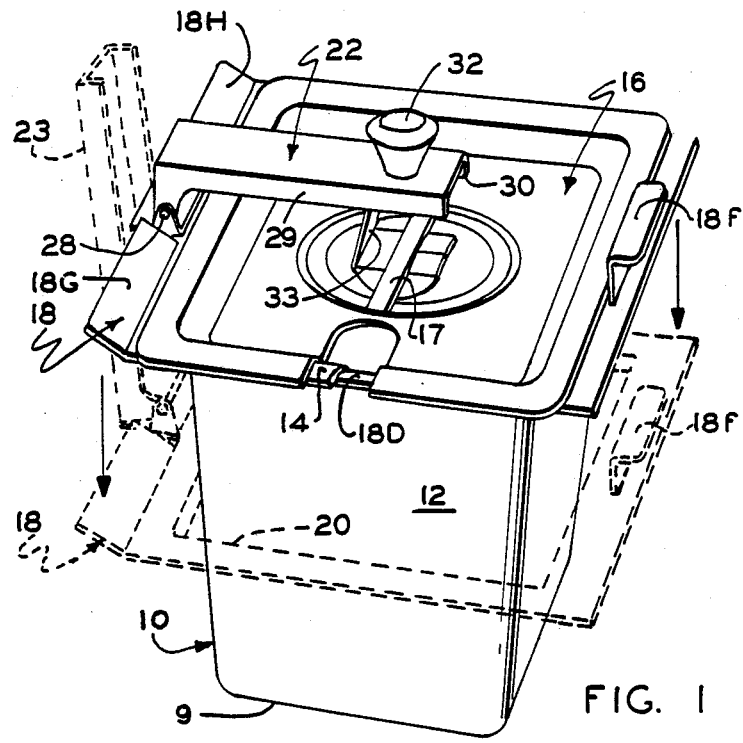
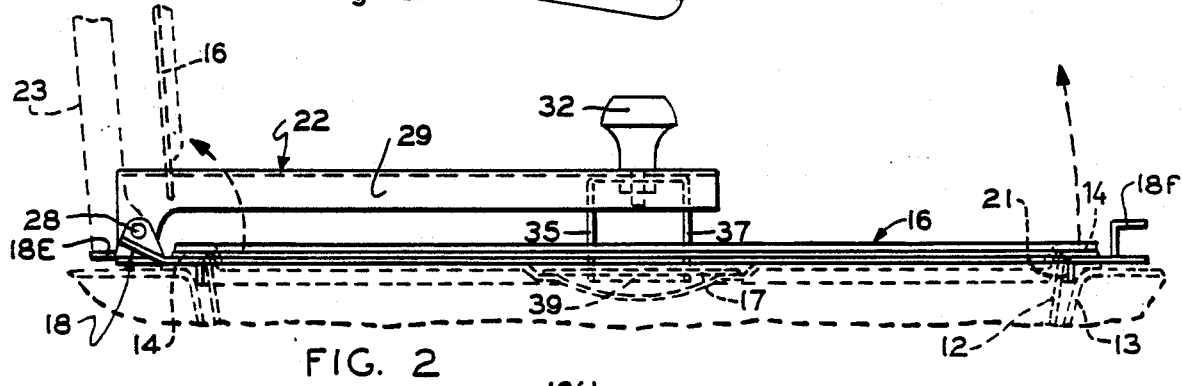
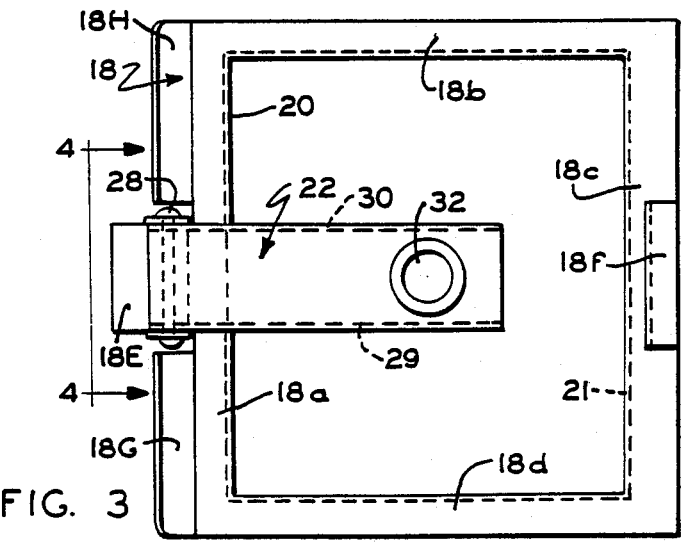
FIG. 1
FIG. 2
FIG. 4
FIG. 5
FIG. 3

4,921,119

FOOD WARMER AND LIFTING FRAME

FIELD OF THE INVENTION

The present invention relates to vessels for food and more particularly to a food cooking and warming vessel.

BACKGROUND OF THE INVENTION

Food warming vessels, particularly the type used in the institutional trade for warming food in restaurants, cafeterias and other food service outlets, because of their large size and weight are sometimes difficult to remove from the heated well and carry when the vessel needs to be refilled. A 23-quart capacity food warmer when completely filled can weigh up to 50 pounds and can easily slip out of the hands unless some means is provided for assuring a secure grip. However, handles connected to such vessels make them more bulky and difficult to clean.

It is sometimes desirable to support the cover of a warming vessel upon an arm hinged to the vessel. A shortcoming of prior warming vessels that employ such a cover support arm is the necessity for mounting the cover support arm from the top of the food warmer. When the cover support arm is hinged in this way to the food warming vessel itself, the arm can get in the way, for example when the vessel is to be moved quickly from one area to another or when it is to be cleaned.

In view of the shortcomings of the prior art, it is one object of the invention to provide a secure and reliable provision that allows one to grasp and carry a food warming vessel with a feature which enables the vessel itself to be moved about, washed, refilled and replaced without a carrying handle present. A further object is to find a way to provide a support arm for holding and articulating the cover of the vessel so that the cover can be raised and lowered easily from a closed position to an open position with a provision that will prevent the support arm from being in the way when the food warming vessel is to be removed, washed, refilled and replaced.

These and other more detailed and specific objects of the invention will be apparent in view of the following specification and drawings which illustrate by way of example but a few of the various forms of the invention that are possible within the scope of the appended claims.

SUMMARY OF THE INVENTION

The invention provides a combination of a food warming vessel and a lifting frame. The food warming vessel includes a bottom wall and a sidewall with an open wide mouth at its upper edge. A rim projects laterally outward from the upper edge of the sidewall around the open mouth. A separate ring-shaped lifting frame element is provided with a central opening of just the proper size to receive the food warming vessel so that the rim of the vessel rests on the upper surface of the lifting frame. The term "ring-shaped" herein is intended to refer to a frame member that is closed upon itself and has an open center. Portions of the lifting frame extend laterally beyond the free edge of the rim and are adapted to be grasped manually for the purpose of lifting the vessel by supporting it from the rim which rests on the upper surface of the lifting frame. The lifting frame preferably has connected to it a cover supporting arm. In accordance with a preferred form of the invention the cover support arm is connected by means of a hinge to one edge of the lifting frame. The cover support arm is able to pivot about a horizontal axis defined by the hinge between a closed position for holding the cover in place on the vessel and an open position that allows food to be served from the vessel. This is done by swinging the arm upwardly to hold the cover in an upright position away from the vessel.

THE FIGURES

FIG. 1 is a perspective view of a food warming vessel with a cover support arm connected to the cover.

FIG. 2 is a side elevational view of the top portion of the food warming vessel on a larger scale.

FIG. 3 is a top plan view of the supporting frame and cover support arm.

FIG. 4 is an end elevational view taken on line 4—4 of FIG. 3.

FIG. 5 is a top view of another form of cover support arm connected to a cover.

DETAILED DESCRIPTION OF THE INVENTION

Figure 6:
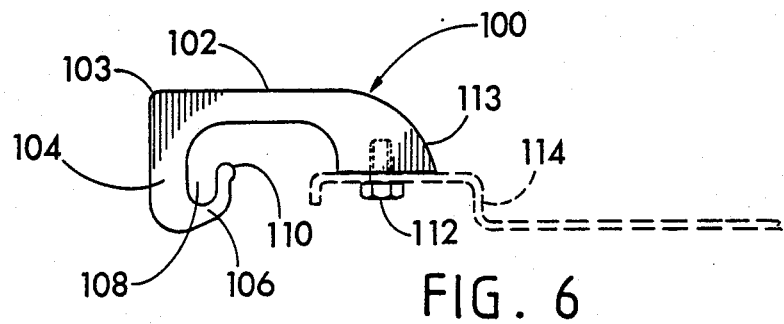
FIG. 6 is a side view of the support arm of FIG. 5 on an enlarged scale.

As shown in the figures, the invention concerns food warmers particularly suited for warming or cooking foods on a steam table of the kind frequently used in institutional food service, e.g. restaurants, cafeterias and the like. So that the vessel or container can be clearly shown, the steam table well itself is shown by dotted lines 13 in FIG. 2.

A conventional steam table container or vessel 10 (FIG. 1) includes the usual bottom wall 9 and sidewall 12, generally rectangular in cross-section. The generally upright sidewall 12 terminates in an upper open wide mouth having an outwardly extending flange or rim 14. The rim 14 extends horizontally from the open mouth on all sides of the vessel 10. Resting on the rim 14 is a standard cover 16 which serves to seal the vessel 10 when in use. The vessel 10, the steam table 13, and the cover 16 thus far described are all conventional commercial items. While the vessel 10 and the cover 16 have been illustrated as generally square in configuration, they can be round or circular if so desired.

Positioned just beneath the rim 14 as a separate piece is a ring-shaped lifting frame 18 which can either be formed from sheet metal such as stainless steel stamping or can be molded from plastic. The frame 18 in this case includes four integral side portions 18a–18d at right angles to one another surrounding a square opening 20. While the frame 18 has been shown as square with a square opening 20, it can be circular or of some other appropriate shape to fit the vessel 10.

The frame 18 is provided with a means for lifting the vessel 10. This means can comprise a simple extension or, if desired, a separate handle such as the handles shown at 18e and 18f. On either side of the handle 18e, the frame 18 includes upwardly deflected oblique flange portions 18g and 18h that act to stiffen the lifting frame but can also be used for grasping and lifting the frame and for deflecting water from condensation back into the well. Surrounding the opening 20 is a downwardly turned vertically disposed stiffening flange 21 that extends around the entire periphery of the opening 20. The flange 21 can extend downwardly a fraction of an inch, e.g. about one-quarter of an inch in a typical application. As can be clearly seen in the figures, the rim 14 of the vessel 10 rests on the lifting frame 18. The frame 18 includes portions, specifically the portions 18c, 18e, 18g and 18h, on either end thereof that extend beyond the free edge of the rim 14 so that they can be grasped manually for lifting the vessel 10. However, when the vessel 10 is to be removed from the frame 18, the frame 18 can be lowered as shown by dotted lines in FIG. 1 to separate it from the vessel, allowing the vessel 10 to be moved, cleaned, refilled and handled separately from the lifting frame 18.

On the left side of the lifting frame 18 as shown in the figures is provided a horizontal hinge 28 to which a cover support arm 22 is pivoted. Pivotal connection at the hinge 28 between the cover support arm 22 and the frame 18 allows the arm 22 and the attached cover 16 to be elevated to the upright dotted line position of FIG. 2 when food is to be served.

The arm 22 includes a pair of longitudinally extending downwardly turned parallel side flanges 29 and 30, portions of which are affixed to the hinge 28. The lifting handle 32 is connected to the free end of the arm. Positioned below the lifting handle 32 is a cover connecting and supporting clasp 33 that includes a cover engaging portion 34 which snaps into place below the horizontally disposed metal strip 17 which is rigidly connected as by welding to the cover 16 to serve as a handle for the cover. While various forms of cover clasps 33, 34 can be provided, one suitable clasp is described in more detail in our co-pending application entitled LID SUPPORT FOR FOOD WARMING VESSELS, SN 270,817, Another type of cover clasp is shown in FIG. 2. In this case the clasp includes a U-shaped connecting assembly including a horizontally disposed center section connected to the handle 32 by means of a suitable fastener and a pair of downwardly depending parallel laterally spaced apart flanges formed from sheet metal to which is secured a horizontally disposed retainer or keeper member 39 adapted to fit beneath the handle 17 of the cover 16 to hold the handle 17 in place at the lower ends of the arms 35, 37. This form of connector is also described in the aforementioned co-pending application.

To use the invention, the vessel 10 is inserted into the opening 20 of the lifting frame 18. The lifting frame is then raised until the portions 18a–18d contact the lower surface of the rim 14. The cover 16 is then attached to the clasps 33, 34 or 35–37 as the case may be to mount it thereon, and the arm 22 is lowered from its elevated dotted line position 23 as shown in FIGS. 1 and 2 to the solid line position so that the cover seals the mouth of the vessel 10.

Whenever the vessel 10 has to be refilled it can be easily lifted by the handles 18e, 18f and yet the entire frame 18, cover 16 and support arm 22 can be removed when the vessel 10 needs to be cleaned.

Refer now to FIGS. 5 and 6 which illustrate another form of cover support arm 100 in accordance with the invention. As shown in these figures, the cover support arm 100 is relatively short in length compared to the arm 22. The arm 100 is typically 2 or 3 inches long and as shown in this case connected to the upper surface of a cover 114 near the periphery thereof by means of a bolt 112 (FIG. 6) or other suitable fastening method. The cover 114 in this case is circular and has a raised circular lip at the outer edge to which a downwardly projecting inner end portion 113 of the support arm 100 is connected. The arm 100 includes a horizontally disposed outwardly extending center section 102 having at its outer end a corner 103 adjacent downwardly projecting portion 104 at the lower end of which is a U-shaped hook 106 that defines an upwardly opening horizontally disposed slot 108 which in operation fits around a horizontally disposed pivot pin such as the pin 28 of FIGS. 1-4. At the free end of the U-shaped hook 106 is provided a projection 110. This projection will help make the free end of the hook 106 large enough so that it will not be likely to unintentionally slip off of the pivot pin upon which it is mounted. The arm 100 can be formed in various ways, but it is preferably an extrusion of metal such as aluminum cut repeatedly at uniform intervals to form arms of any width desired. The arm 100 is also shown in FIG. 13 supported from a removable mounting bracket which will be described below.

Figure 13:
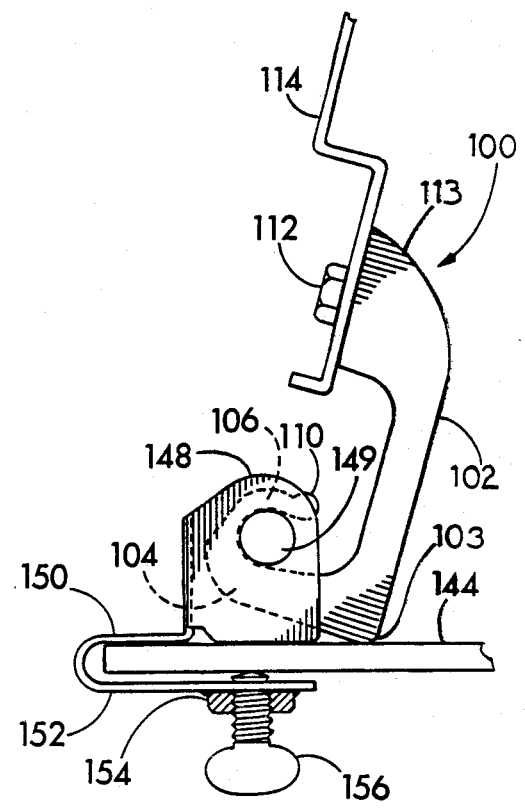
FIG. 13 is a side elevational view of the bracket, the cover support arm and associated structure.

In FIG. 13 the cover support arm 100 is shown in its raised position wherein the cover is held upright. It can be seen that the corner 103 serves as the stop for holding the support arm 100 and cover 114 in its upright position when food is being served.

Figure 7:
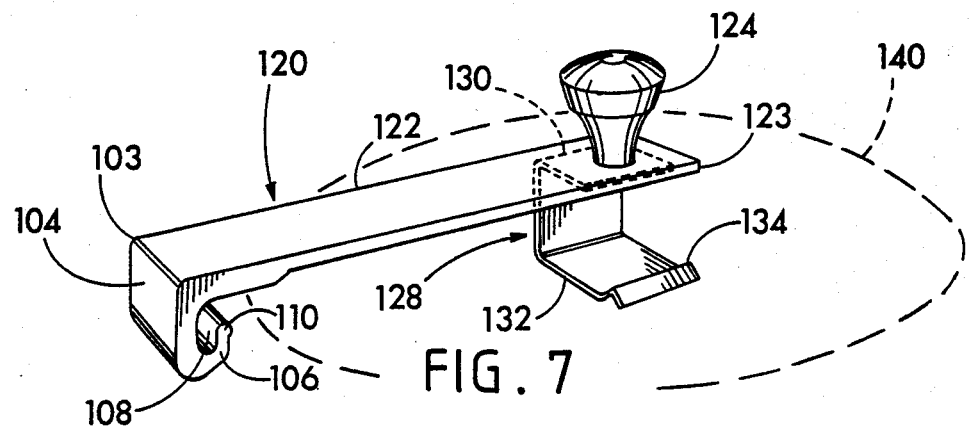
FIG. 7 is a perspective view of another form of lid or cover supporting arm in accordance with the invention.
Figure 8:
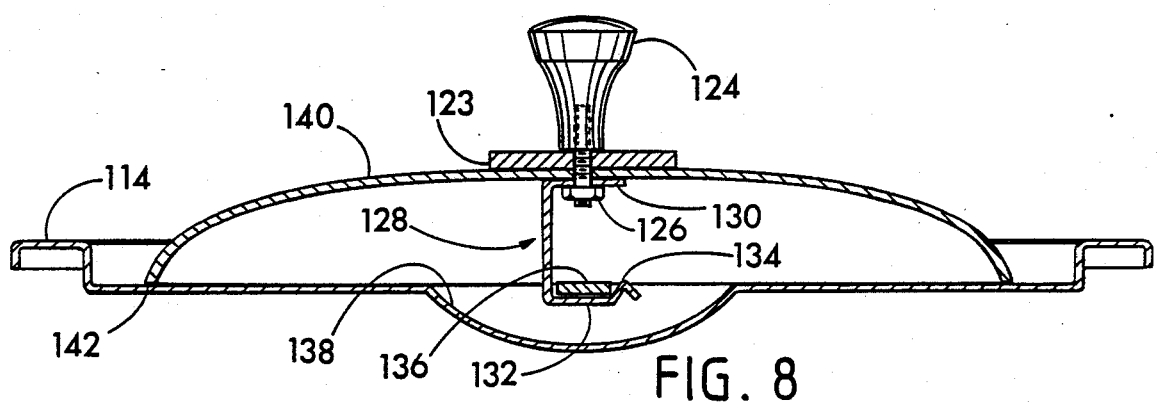
FIG. 8 is a vertical cross-sectional view taken through a cover support arm of the type illustrated in FIG. 7 as it appears when connected to a cover.

Refer now to FIGS. 7 and 8 which illustrate another form of cover supporting arm in accordance with the invention. In FIGS. 7 and 8 is shown a cover support arm 120 having an elongated horizontally disposed and centrally extending arm portion 122 which in this case comprises a flat metal bar having an inner or central end 123 located approximately over the center of the cover to which is connected a handle 124 that includes a downwardly extending rivet or threaded rod as shown in FIG. 8 with a nut 126 secured to its lower end for connecting the handle to the upper surface of the inner end portion 123 of the arm 120. In this case a decorative dome 140 and a resilient metal connector 128 are interposed between the nut 126 and the handle 124 beneath the arm 120. The cover 114 includes a handle 136 composed of a metal strap or bar welded to the cover 114 across the pocket 138 similar to the handle 17 of the cover 16 (FIG. 1). The connector 128 is generally C-shaped and formed from a resilient sheet metal having vertically spaced upper and lower horizontally disposed portions 130 and 132, respectively, connected together by a vertically disposed center piece. The free end of the lower portion 132 is bent to form an upwardly extending projection 134 which, when the cover 114 is being mounted, slides beneath the handle 136 of the cover 114 and then snaps up on the right hand side of the handle 136 as seen in FIG. 8 to securely retain the arm 120 on the cover 114. In this way decorative dome 140 as well as the arm 120 are removably retained in place on the cover 114 by the connector 128. The connector 128 can be mounted with the raised portion 134 at its free end either parallel (FIG. 9) to the pivot pin slot 108 or at right angles to it (FIGS. 7 and 8) depending upon the orientation of the handle 136 of the cover 114. The height of the dome 140 is approximately equal to the height of the connector 128 to enable the connector 128 to securely retain the arm 100 or 120 as the case may be in place on the cover 114. The left end of the arm 120 is similar to the left end of the arm 100 of FIG. 6 and includes a downward extension 104 terminating in an upwardly directed hook portion 106 which defines a transverse slot 108 that enables the arm 120 to be removably mounted on a pivot pin similar to the pin 28 of FIGS. 1–4. The arm 120, like 100, is preferably a metal extrusion, a nonferrous metal such as aluminum being preferred although plastic can also be used.

Figure 9:
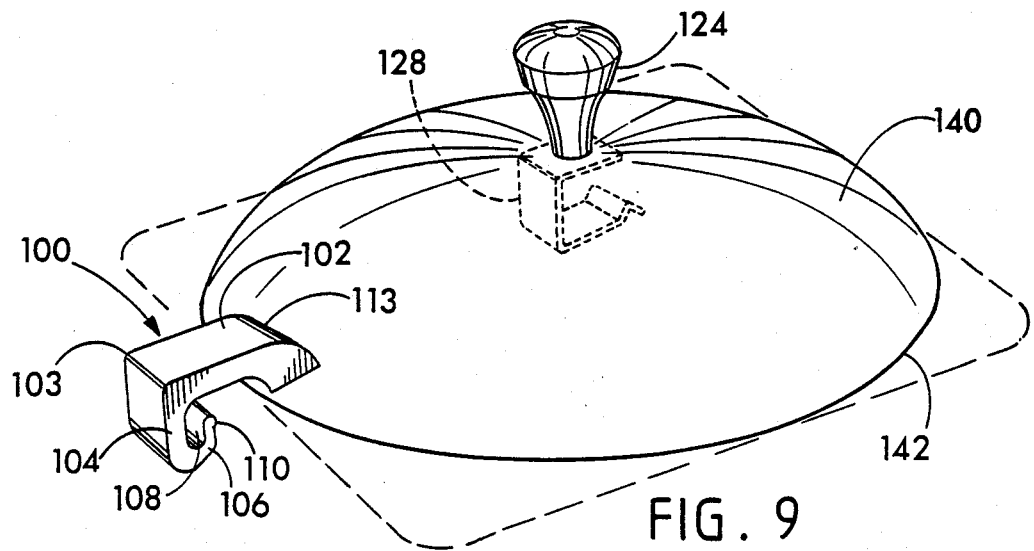
FIG. 9 is a perspective view of another cover support arm connected to a decorative dome.
Figure 10:
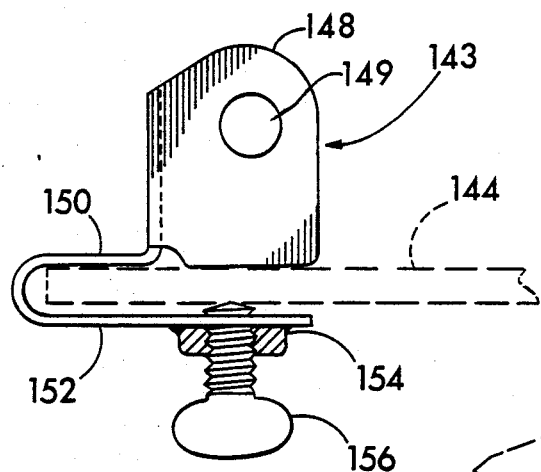
FIG. 10 is a side view of a bracket for a cover support arm.
Figure 11:
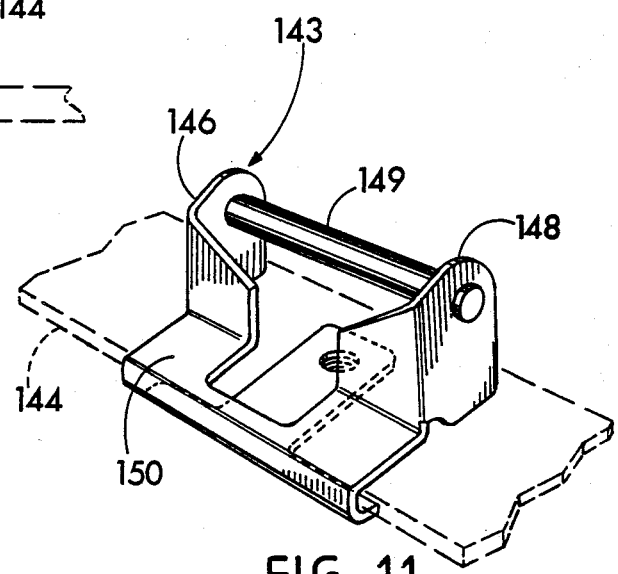
FIG. 11 is a perspective view of the bracket of FIG. 10.

Refer now to FIG. 9 which shows a modified form of the invention. In this case the arm 100 is connected directly to the dome 140 in any suitable manner as by means of fasteners such as a bolt 112 (not shown in the figure). In this instance the arm 100 is connected to the upper surface of the periphery of the dome 140 adjacent its outer edge 142. The connector 128 is secured to the inside surface of the dome 140 at its center in the same manner as in FIG. 8, but in this case arm 120 is not present. The dome 140 can be of any suitable shape, for example rectangular as depicted by dotted lines in FIG. 9 which is the preferred form in the event that the cover 114 and food warmer are rectangular as shown in FIG. 1.

Refer now to FIGS. 10–14 which illustrate a bracket indicated generally at 143. The bracket 143 is removably mounted upon a supporting frame 144 of the same type designated 18 in FIGS. 1–4 except that in this case the frame 144 does not include upwardly inclined handle portions 18h and 18g. The bracket 143 is formed from sheet metal and includes a pair of laterally spaced apart vertically disposed and parallel sheet metal wings 146 and 148 suitably bored to receive a pivot pin 149 similar to the pin 28 already described. The wings 146 and 148 are integral with a horizontally disposed bracket body 150 which has a 180° bend therein to provide a horizontaly strap 152 spaced below the body portion 150 to form a slot for receiving the frame 144. The strap 152 has welded to it a nut 154 in which is threaded a thumb screw 156 that is used for securely retaining the bracket 143 in place on the frame 144.

Figure 12:
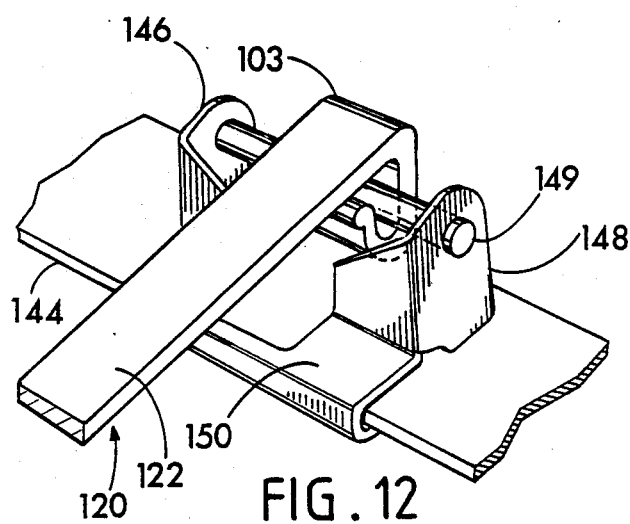
FIG. 12 is a view similar to FIG. 11 with the cover support arm mounted on the bracket.

As shown in FIGS. 12 and 13, either of the cover support arms 100 or 120 as the case may be can be removably mounted upon the bracket 143 with the pin 149 extending through the horizontal slot within the hook 106 of the arm. During use, when the cover 114 is raised by lifting the handle 124, the corner 103 will strike the upper surface of the frame 144 for the purpose of holding the arm and cover in an upright position as shown in FIG. 13. The bracket 143 can be moved from one frame to another or from one spot to another on the same frame. In addition, it can be easily removed for cleaning. When the arm 100 or 120 as the case may be is to be removed from the bracket 143, the bracket is first removed from the frame 144 by loosening the thumb screw 156. This enables the arm to be lowered, i.e. pivoted clockwise as seen in FIG. 13 to a position beyond the normal "down" position of the cover 114 and in such a position the pivot pin 149 can be slid upwardly in the slot 108 within the hook 106 allowing the arm to be easily removed from the bracket 143 for cleaning or other purposes.

Many variations within the scope of the appended claims will be apparent to those skilled in the art once the principles described above are understood.

What is claimed is:

1. The combination of a food warmer and lifting frame comprising, a food warming vessel including side and bottom walls and an upper open wide mouth having a rim therearound, a ring-shaped lifting frame element encircling the food warming vessel and having a central opening adapted to receive the food warming vessel by inserting the vessel into the central opening from above so that the rim rests on the lifting frame and the vessel is free to move upwardly out of the lifting frame but not downwardly, said lifting frame including portions extending peripherally beyond the free edge of the rim such that the lifting frame is exposed and thereby adapted to be grasped manually for lifting the vessel by supporting the vessel from the rim.

2. The combination of claim 1 wherein lifting handles are provided on the lifting frame, said handles are affixed to the portions of the lifting frame that extend peripherally beyond the free edge of the rim whereby the lifting frame with the vessel supported thereupon by the rim can be lifted by means of the handles and carried from a food warmer to a remote location for refilling.

3. The combination of claim 1 wherein the lifting frame has a cover support arm connected thereto for engagement with a cover and the arm is movably connected to the lifting frame enabling the cover to be moved from a closed position sealing the vessel to an open position wherein the cover is separated from the vessel.

4. The apparatus of claim 3 wherein the cover support arm is hinged to the frame at one end of the frame to articulate on the frame about a horizontally disposed axis, said arm has a free end adapted to be connected to the cover, said arm thereby allowing the cover to be articulated with respect to the frame between a closed position in which the arm extends horizontally to an upright position above said hinge and a clasp is provided on the free end of the arm for securing the cover to the cover support arm whereby the support arm and cover can be raised to an elevated position above a portion of said frame to which said hinge is connected.

5. The apparatus of claim 1 wherein the frame is ring-shaped and closed upon itself and is formed from a sheet metal stamping having a downwardly turned flange surrounding said central opening with a pair of upwardly deflected inclined obliquely positioned flange portions at one end of thereof for stiffening said frame and to serve as a handle therefor.

6. The apparatus of claim 5 wherein a handle member is connected to the frame on the opposite end thereof from the obliquely inclined flange members.

7. The apparatus of claim 5 wherein a cover support arm is hinged to the frame between said obliquely inclined flanges, a first lifting handle is provided on the frame adjacent the hinge and between the inclined flanges and a second handle is connected to the frame on the opposite side of the frame from said first handle whereby a pair of spaced apart opposed handles are provided on opposite sides of the frame to assist in lifting and carrying the vessel.

8. The apparatus of claim 3 wherein the arm comprises an extrusion having a horizontally disposed radially extending center portion, a downwardly extending end portion located above the lifting frame and said downwardly extending portion of the arm terminates in a centrally and upwardly directed hook portion having a horizontally disposed transversely extending upwardly opening slot therein to receive a pivot pin mounted upon the lifting frame for mounting said cover thereon for pivotal movement.

9. The apparatus of claim 8 wherein the food warmer has a cover and said arm includes a central end portion opposite said hook and said central end portion of the arm is connected to the cover for supporting the cover for pivotal movement about said pivot pin.

10. The apparatus of claim 8 wherein the cover support arm includes a downwardly extending portion at an end thereof opposite said hook portion and said downward extension is fastened to the periphery of the cover.

11. The apparatus of claim 8 wherein the arm is an extrusion with outer and inner ends extending from a position proximate to the periphery of the lifting frame at the outer end to the center of the food warmer at the inner end, a cover retaining connector is secured to the inner end of the arm in a position extending downwardly therefrom, and said connector includes a resilient free end having a snap-fit connection with said cover to removably secure the inner end of the cover support arm to the cover near the center thereof.

12. The apparatus of claim 11 wherein the cover includes a horizontally disposed strap member defining a cover handle and the free end of the connector is snap-fitted beneath the cover handle.

13. The apparatus of claim 8 wherein a bracket is removably secured to the lifting frame, said bracket includes a pair of spaced apart upright members positioned above the lifting frame, a horizontally disposed laterally extending pivot pin mounted between the upright members and fastener means for releasably securing the bracket to the lifting frame adjacent the periphery thereof and the arm is pivotally mounted upon said pivot pin to allow the cover to swing up and down about the pin.

14. The apparatus of claim 8 wherein said food warmer includes a cover, an upwardly arched decorative dome is removably mounted on the upper surface of the cover, said cover support arm includes an outer end pivotally connected to the lifting frame, a central end connected to the dome and a connector means is mounted within the dome and extends downwardly therefrom for removably securing the dome to the cover.

15. The apparatus of claim 14 wherein the cover includes a horizontally disposed strap defining a handle for the cover and the connector comprises a sheet metal clip extending downwardly from the center of the cover and including a resilient horizontally disposed lower segment snap-fitted beneath the handle of the cover and including a raised section at the free end adapted to snap upwardly when said horizontal segment is slid beneath the handle of the cover.

16. A food warming vessel including side and bottom walls and an upper open wide mouth having a rim therearound, a cover for the vessel, a cover support handle arm having outer and inner ends, said outer end being mounted for pivotal movement relative to the food warming vessel adjacent the mouth thereof enabling the cover to be moved from a closed position sealing the vessel to an open position wherein the cover is separated from the vessel, the arm comprises an extrusion having a horizontally disposed center portion, a downwardly extending outer end portion located above the rim and said downwardly extending portion of the arm terminates in a centrally and upwardly directed hook portion having a horizontally disposed transversely extending upwardly opening pivot receiving slot therein for mounting the arm for said pivotal movement.

17. The warmer of claim 16 wherein the arm has a handle at its inner end and a connector extends downwardly from the handle to removably connect the inner end of the handle to the cover.

18. The warmer of claim 17 wherein an upwardly arched downwardly opening decorative dome is interposed between the arm and the cover.

* * * * *